US007674558B2

(12) United States Patent
De Jonghe et al.

(10) Patent No.: US 7,674,558 B2
(45) Date of Patent: Mar. 9, 2010

(54) ALLEVIATION OF VOLTAGE DELAY IN LITHIUM-LIQUID DEPOLARIZER/ELECTROLYTE SOLVENT BATTERY CELLS

(75) Inventors: Lutgard De Jonghe, Lafayette, CA (US); Yevgeniy S. Nimon, Danville, CA (US); Steven J. Visco, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

(21) Appl. No.: 12/273,119

(22) Filed: Nov. 18, 2008

(65) Prior Publication Data

US 2009/0071835 A1      Mar. 19, 2009

Related U.S. Application Data

(62) Division of application No. 10/455,259, filed on Jun. 4, 2003, now Pat. No. 7,482,096.

(51) Int. Cl.
*H01M 4/58* (2006.01)
(52) U.S. Cl. .................................. 429/231.95
(58) Field of Classification Search ............... 29/623.5; 429/231.9, 231.95, 321.4, 322, 323
See application file for complete search history.

(56) References Cited

U.S. PATENT DOCUMENTS

| | | |
|---|---|---|
| 3,271,196 A | 9/1966 | Oswin |
| 3,926,669 A | 12/1975 | Auborn |
| 4,020,240 A | 4/1977 | Schlaikjer |
| 4,238,552 A | 12/1980 | Dey et al. |
| 4,366,616 A | 1/1983 | Catanzarite |
| 4,503,088 A | 3/1985 | Fleischer |
| 4,707,422 A | 11/1987 | de Neufville et al. |
| 4,784,927 A | 11/1988 | Klinedinst |

(Continued)

FOREIGN PATENT DOCUMENTS

EP          0 696 077          2/1996

(Continued)

OTHER PUBLICATIONS

EP patent application No. 04754704.7, Examination Report mailed Aug. 22, 2008.

(Continued)

*Primary Examiner*—Patrick Ryan
*Assistant Examiner*—Monique Wills
(74) *Attorney, Agent, or Firm*—Weaver Austin Villeneuve & Sampson LLP

(57) ABSTRACT

Voltage delay in an active metal anode/liquid cathode battery cell can be significantly reduced or completely alleviated by coating the active metal anode (e.g., Li) surface with a thin layer of an inorganic compound with Li-ion conductivity using chemical treatment of Li surface. Particularly, preferred examples of such compounds include lithium phosphate, lithium metaphosphate, and/or their mixtures or solid solutions with lithium sulphate. These compounds can be formed on the Li surface by treatment with diluted solutions of the following individual acids: $H_3PO_4$, $HPO_3$ and $H_2SO_4$, their acidic salts, or their binary or ternary mixtures in a dry organic solvent compatible with Li, for instance in 1,2-DME; by various deposition techniques. Such chemical protection of the Li or other active metal electrode significantly reduces the voltage delay due to protected anode's improved stability toward the electrolyte.

16 Claims, 3 Drawing Sheets

U.S. PATENT DOCUMENTS

| | | | |
|---|---|---|---|
| 4,833,048 | A | 5/1989 | De Jonghe et al. |
| 4,917,974 | A | 4/1990 | Visco et al. |
| 5,162,175 | A | 11/1992 | De Jonghe et al. |
| 5,182,177 | A | 1/1993 | Schlaikjer |
| 5,314,765 | A | 5/1994 | Bates |
| 5,516,598 | A | 5/1996 | Chu et al. |
| 5,523,179 | A | 6/1996 | Chu |
| 5,532,077 | A | 7/1996 | Chu |
| 5,582,623 | A | 12/1996 | Chu |
| 5,686,201 | A | 11/1997 | Chu |
| 5,789,108 | A | 8/1998 | Chu |
| 5,814,420 | A | 9/1998 | Chu |
| 5,882,812 | A | 3/1999 | De Jonghe et al. |
| 6,017,651 | A | 1/2000 | Chu et al. |
| 6,025,094 | A | 2/2000 | Chu et al. |
| 6,030,720 | A | 2/2000 | Katz et al. |
| 6,068,950 | A | 5/2000 | Gan et al. |
| 6,096,447 | A | 8/2000 | Gan et al. |
| 6,110,236 | A | 8/2000 | Chu et al. |
| 6,165,644 | A | 12/2000 | Chu et al. |
| 6,198,701 | B1 | 3/2001 | De Jonghe et al. |
| 6,200,701 | B1 | 3/2001 | Gan et al. |
| 6,200,704 | B1 | 3/2001 | De Jonghe et al. |
| 6,203,942 | B1 | 3/2001 | Gan et al. |
| 6,210,832 | B1 | 4/2001 | Chu et al. |
| 6,214,061 | B1 | 4/2001 | Tsang et al. |
| 6,225,002 | B1 | 5/2001 | Chu et al. |
| 6,248,481 | B1 | 6/2001 | De Jonghe et al. |
| 6,274,269 | B1 | 8/2001 | Gan et al. |
| 6,358,643 | B1 | 3/2002 | Katz et al. |
| 6,376,123 | B1 | 4/2002 | Chu |
| 6,402,795 | B1 | 6/2002 | Chu et al. |
| 6,413,284 | B1 | 7/2002 | Chu et al. |
| 6,413,285 | B1 | 7/2002 | De Jonghe et al. |
| 6,432,584 | B1 | 8/2002 | Tsang et al. |
| 6,511,772 | B2 | 1/2003 | Gan et al. |
| 6,537,701 | B1 | 3/2003 | Chu et al. |
| 6,632,573 | B1 | 10/2003 | Nimon et al. |
| 6,723,140 | B2 | 4/2004 | Chu et al. |
| 6,737,193 | B2 | 5/2004 | Umemoto |
| 6,737,197 | B2 | 5/2004 | Chu et al. |
| 6,911,280 | B1 | 6/2005 | De Jonghe et al. |
| 6,955,866 | B2 | 10/2005 | Chu et al. |
| 6,991,662 | B2 | 1/2006 | Visco et al. |
| 7,070,632 | B1 | 7/2006 | Visco et al. |
| 7,261,976 | B2 | 8/2007 | Mizutani et al. |
| 7,482,096 | B2 | 1/2009 | De Jonghe et al. |
| 2002/0160268 | A1 | 10/2002 | Yamaguchi et al. |
| 2003/0044680 | A1* | 3/2003 | Umemoto .................. 429/213 |
| 2004/0253510 | A1 | 12/2004 | De Jonghe et al. |
| 2005/0186469 | A1* | 8/2005 | De Jonghe et al. .......... 429/137 |

FOREIGN PATENT DOCUMENTS

| | | |
|---|---|---|
| EP | 0 917 224 | 5/1999 |
| EP | 0 918 364 | 5/1999 |
| EP | 1 050 916 | 11/2000 |
| EP | 1 162 675 | * 12/2001 |
| EP | 1 193 781 | 4/2002 |

OTHER PUBLICATIONS

"ER Lithium Thionyl Chloride Battery", http://www.maxwell.co.jp/e/products/industrial/battery/er/index.html, Mar. 24, 2003, pp. 1-4.

European patent application No. 04 776 270.3-2119, European Search Report mailed Feb. 28, 2007.

U.S. Appl. No. 10/861,336, Office Action mailed Aug. 19, 2008.

Ein-Eli Y. et al., "New Electrolyte System for Li-Ion Battery", J. Electrochem. Soc., vol. 143, No. 9, Sep. 1996, pp. 195-197.

Anders et al., "Plasma is Produced Simply", R&D Research & Development, R&D Magazine, vol. 39, No. 10, Sep. 1997, www.rdmag.com, p. 65.

EP patent application No. 04776270.3, examination report dated Aug. 19, 2008.

U.S. Appl. No. 11/944,906, Office Action mailed Dec. 9, 2008.

U.S. Appl. No. 10/861,336, Office Action mailed May 29, 2009.

* cited by examiner

ALLEVIATION OF VOLTAGE DELAY IN LITHIUM-LIQUID DEPOLARIZER/ELECTROLYTE SOLVENT BATTERY CELLS

CROSS REFERENCE TO RELATED APPLICATION

This application is a divisional of prior Application Ser. No. 10/455,259 filed on Jun. 4, 2003, (now U.S. Pat. No. 7,482,096, issued Jan. 27, 2009).

BACKGROUND OF THE INVENTION

This invention relates to non-aqueous, active metal-liquid depolarizer/electrolyte solvent-based primary battery cells, for example, lithium-thionyl chloride (Li—$SOCl_2$) batteries. In particular, the invention relates to the alleviation of voltage delay upon load of such battery cells.

Much effort has been expended in the development of high energy density cell systems which provide both high voltage and total capacity. The high energy density cell systems are centered around the use of active metals (alkali and alkaline earth metals which are unstable in aqueous environments) as anodes in non-aqueous liquid depolarizer/electrolyte solvent-based (also often referred to as liquid cathode) cells. Lithium in particular has shown great promise as an anode material because of its high potential and low weight.

Various cell systems have been developed utilizing lithium as the anode electrode material. Cells having liquid cathode depolarizers, which generally serve the dual function of electrolyte salt solvent and cathode depolarizer, have shown promise in terms of voltage stability and high discharge capability. When a cell of this type is not being discharged, the liquid depolarizer/electrolyte solvent reacts with the anode metal to a limited extent resulting in a relatively thick resistive surface film being formed on the surface of the anode. In Li—$SOCl_2$ cells this resistive surface film is composed mostly of polycrystalline LiCl. Full reaction between the anode and liquid depolarizer with which it is in contact is thereby substantially prevented and cell self discharge is limited. Such cells are nevertheless operable since the resistive LiCl film is dissipated during cell discharge. However, there is generally a lengthy "voltage delay" (defined as the length of time to attain an operating voltage after the initial load is applied) upon the onset of cell discharge as the film is dissipated.

One of the most common liquid depolarizer/electrolyte solvents is thionyl chloride ($SOCl_2$) which, in combination with lithium, provides a cell couple having a very high voltage (about 3.65 V), discharge capability, energy density, and stability of discharge voltage. However, a limiting factor in the utility of Li—$SOCl_2$ cells, particularly for applications requiring a high discharge rate, is the aforementioned "voltage delay" resulting from the formation of the resistive LiCl film on the anode. This negative effect is especially pronounced for aged cells discharging at low temperature.

Electrolyte salts or solutes used in thionyl chloride depolarized cells are well known, for example as described at length in U.S. Pat. No. 3,926,669. The most preferred and the most widely used electrolyte salt or solute is lithium tetrachloroaluminate ($LiAlCl_4$). In order to alleviate the effects of voltage delays, the use of electrolyte salts other than $LiAlCl_4$ has been proposed. For example, U.S. Pat. Nos. 4,238,552 and 4,020,240 describe the use certain halo-gallate, indate or thallate salts and chloroborate salts, respectively. Other alternative electrolyte salts have also been proposed. While advantages have been reported with the use of these alternative electrolyte salts, drawbacks have also been noted in at least some cases, including increased cost and/or decreased performance.

Accordingly, it is believed that Li—$SOCl_2$ and like cells may be improved and such improvement would be desirable.

SUMMARY OF THE INVENTION

Voltage delay in an active metal anode/liquid cathode battery cell can be significantly reduced or completely alleviated by coating the active metal anode (e.g., Li) surface with a thin layer of an inorganic compound with Li-ion conductivity using chemical treatment of the Li surface. Particularly preferred examples of such compounds include lithium phosphate, lithium metaphosphate, and/or their mixtures or solid solutions with lithium sulphate. These compounds can be formed on the Li surface by treatment with diluted solutions of the following individual acids: $H_3PO_4$, $HPO_3$ and $H_2SO_4$, their acidic salts, or their binary or ternary mixtures in a dry organic solvent compatible with Li, for instance in 1,2-DME. Alternatively, the compounds may be deposited physically on the Li surface. Such chemical protection of the Li or other active metal electrode significantly reduces the voltage delay due to the protected anode's improved stability toward the electrolyte.

The material of the protective layer should have very low solubility in the battery liquid cathode/electrolyte. Lithium phosphate and lithium metaphosphate satisfy this requirement: for instance, the experimentally determined solubility of $Li_3PO_4$ in 1.5 M $LiAlCl_4$, $SOCl_2$ solution is less than 60 mg/l and in 1.5 M $LiAlCl_4$+0.5 M $AlCl_3$, $SOCl_{2\,solution\,about}$ 50 mg/l, and solubility of $LiPO_3$ in $SOCl_2$ is less than 77 mg/l. Addition of the Li or other active metal salt or salts corresponding to the protective film material(s) to the electrolyte system can also be used to saturate the electrolyte with the already minimally soluble protective film material further suppressing dissolution of the protective film in the liquid cathode/electrolyte.

An important advantage of protected anodes in accordance with this invention is associated with suppression of Li corrosion and inhibition of buildup of a LiCl-based surface resistive layer responsible for voltage delay. In addition, the use of acid mixtures for Li surface treatment in some embodiments can also be beneficial by increasing the ionic conductivity of the protective layer. Presence of anions with different valences (multivalent or "aliovalent" anions) in the protective layer can increase its conductivity because they result in the formation of additional mobile ionic point defects in the crystalline lattice.

Further, the use of protected Li anodes allows for the use electrolyte systems that would otherwise be detrimental to Li battery cells, particularly the cathodes of such cells. The cathode side of lithium-thionyl chloride (Li—$SOCl_2$) and the like battery cells is prone to precipitation of LiCl in the pores of carbon current collector. The rate capability of the cathodes can be improved by solubilizing the LiCl precipitate with additions to the electrolyte system. Addition of $AlCl_3$ to a conventional electrolyte system leads to the dissolution of LiCl in the pores of the cathode carbon current collector while the presence of the protective coating on the anode prevents the $AlCl_3$, which is corrosive to Li, from corroding the anode.

Many applications require not just one continuous full discharge, but rather a partial discharge followed by storage and further discharge or even several discharge-rest-discharge iterations. In this case, protection of a Li or other active metal anode surface in a liquid cathode battery cell can be achieved by incorporation into the electrolyte/liquid cathode system of additives that can react with any exposed Li surface to form a protective layer based on lithium phosphate or phosphate and sulfate. Such additives as $H_3PO_4$ and $HPO_3$ acids, $LiH_2PO_4$ and $Li_2HPO_4$ acidic salts or combinations thereof with each other or sulfuric acid or its active metal salts, and $NR_4H_2PO_4$ where R is ($C_4H_9$) or other alkyls may be used for this purpose. They can effectively heal cracks, which form in the protective layer during partial discharge. An important feature of these additives is solubility in the cell electrolyte, so it is possible to have a large reservoir of the protective layer forming agent in the cell for in situ treatment of the Li anode surface.

These and other features of the invention will be further described and exemplified in the drawings and detailed description below.

DETAILED DESCRIPTION OF THE PREFERRED EMBODIMENTS

Figure 1:
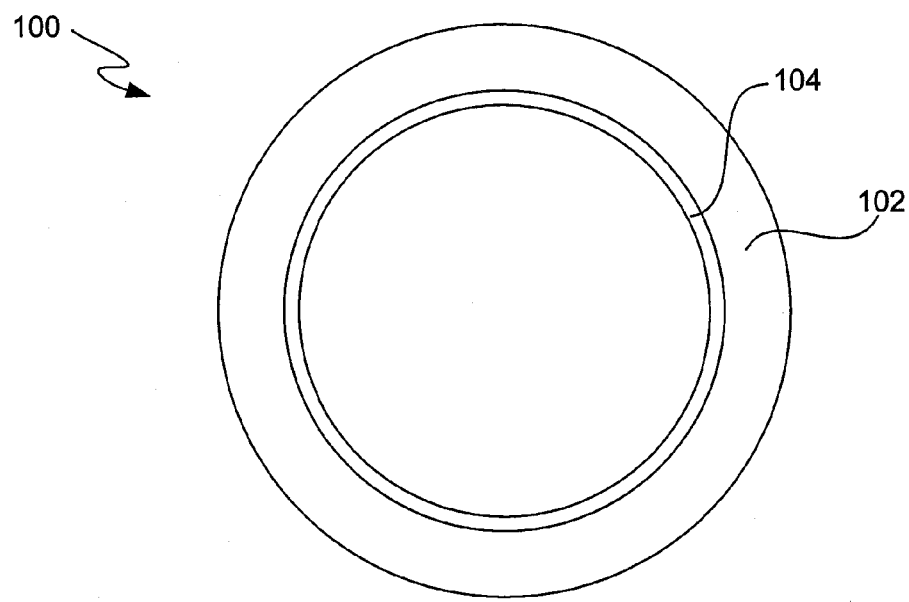
FIG. 1 illustrates a protected anode in accordance with one embodiment of the present invention.

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to the class of active metal battery systems (e.g., batteries having negative electrodes of alkali and alkaline earth metals). Examples of specific embodiments of the invention are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

Voltage delay in an active metal anode/liquid cathode battery cell can be significantly reduced or completely alleviated by coating the active metal anode (e.g., Li) surface with a thin layer of an inorganic compound with Li-ion conductivity using chemical treatment of Li surface. Particularly, preferred examples of such compounds include lithium phosphate, lithium metaphosphate, and/or their aliovalent mixtures or solid solutions with each other or lithium sulfate. Such chemical protection of the Li or other active metal electrode significantly reduces the voltage delay due to protected anode's improved stability toward the electrolyte. The invention provides various implementations of the invention including methods of coating active metal anodes with a protective film, protected active metal anodes, protected active metal anode/liquid cathode battery cells and associated electrolytes.

For clarity of presentation, the invention is described herein primarily with reference to Li anodes. However, it should be understood that suitable anodes may be composed of other active metals and alloys as described herein, and the protective films or reagents described as containing Li may correspondingly contain such other active metals or alloys.

Fabrication Methods

Anode protective films in accordance with the present invention can be made by treating the surface of an active metal (e.g., Li) anode by bringing it into contact with a dilute acidic solution which reacts with the active metal to form a thin layer of an inorganic compound with active metal-ion conductivity. The film should ideally have low solubility in the electrolyte to be used.

In a specific embodiment, the treatment may take place outside a battery cell before its assembly (i.e., ex situ). Alternatively, treatment may occur or in situ (i.e., in a battery cell).

The film may be formed by contacting the active metal (e.g., Li) surface with a diluted solution of the following individual acids: $H_3PO_4$, $HPO_3$, their active metal acidic salts (i.e., $XH_2PO_4$, $X_2HPO_4$ where X is an atom of the active metal (e.g., Li)) and mixtures thereof and mixtures thereof with one or more of $H_2SO_4$ and $LiHSO_4$ in a dry organic solvent compatible with the active metal. Suitable solvents include 1,2-DME, THF or other cyclic or linear ethers, and hydrocarbons such as hexane and heptane. Tetra alkyl ammonium salts of phosphoric acid, such as $NR_4H_2PO_4$, where R is an alkyl group (e.g., $C_4H_9$) may also be used alone or in combination with other agents as noted above.

In some embodiments, the active metal anode material surface may be treated with a solution of an anode protective film forming agent composed of mixed acids with aliovalent (multivalent) anions. In one embodiment, the acids are $H_3PO_4$ and $H_2SO_4$. The use of acid mixtures for Li surface treatment can be beneficial by increasing the ionic conductivity of the protective layer. Presence of anions with different valences (multivalent or "aliovalent" anions) in the protective layer can increase its conductivity because they result in the formation of additional mobile ionic point defects in the crystalline lattice.

The anode is composed of an active metal or alloy in any suitable form. Li foils, for example, 125 micron foil available from Cyprus Foote Mineral Company, is one example. Other examples include lithium binary or ternary alloys with magnesium, calcium, aluminum, tin, silicon, indium, and other metals.

The concentration of the diluted acid solutions in both ex situ and in situ treatments is generally less than 10% by weight, for instance less than 1% by weight, and is preferably in the ppm range, for example between about 50 to 5000 ppm, more preferably about 100 to 2500 ppm. Phosphoric acid is generally used in higher concentration than sulfuric acid. In one specific example, dry DME containing about 1500 ppm of anhydrous phosphoric acid and about 200 ppm of concentrated sulfuric acid (96-98%) may be used.

Immediately prior to ex situ treatment, the Li surface is preferably cleaned and prepared, for example by polishing. The polishing may be conducted with Tyvec fabric (Model 1509 B, available from Tyvec), for example. Other suitable surface cleaning and preparation techniques include pressing and rolling, and cleaning by means of a rotating brush.

Surface treatment may be conducted using a variety of techniques and may be conducted both ex situ and in situ, as noted above. Particularly preferred ex situ treatments involving contacting of the lithium surface with a protective film forming agent in the liquid phase, for example by dipping, painting, spraying, etc. Unsubstituted acids are generally preferred for ex situ treatment as they provide the most rapid reaction with the active metal surface and formation of the protective film. Duration of the treatment is for as long as is necessary to form an effective protective film, and may be from about 10 seconds to 10 minutes, for example, about two minutes for the composition and concentrations of acids noted above. Effective protective films of this type will generally have a thickness sufficient to substantially prevent reaction of liquid cathode depolarizer/electrolyte solvents, such as thionyl chloride, from reacting with the lithium (or other active metal) anode to form the resistive layer (e.g., LiCl) responsible for the voltage delay. For example, the thickness may be in the range of about 10 to 500 Å, for example, about 50-100 Å.

Alternatively, the protective film may be formed ex situ by a technique such as sputtering, e-beam deposition, chemical vapor deposition and laser ablation of the material(s) of the protective film.

Following Li surface reaction with acids and formation of a protective layer, the Li surface is generally cleaned by rinsing with dry solvent, such as DME and then dried. All described operations are conducted in an inert atmosphere, such as an Ar-filled glove box or processing chamber.

Where the protective film is formed in situ, one or more anode protective film forming agents is added to a battery cell cathode depolarizer/electrolyte. Cathode depolarizer/electrolytes (also referred to herein as electrolyte/liquid cathodes) are typically composed of a liquid oxyhalide, non-metallic oxide or non-metallic halide solvent or mixtures thereof and a dissolved electrolyte salt, often $LiAlCl_4$. Specific examples include thionyl chloride ($SOCl_2$), sulfuric oxychloride (sulphuryl chloride; $SO_2Cl_2$), phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), nitryl chloride ($NOCl$), nitrogen dioxide ($NO_2$), sulfur monochloride ($S_2Cl_2$) and sulfur monobromide ($S_2Br_2$), and mixtures thereof. Thionyl chloride ($SOCl_2$) is most commonly used and preferred in the electrolytes and cells of the present invention.

Acidic salts are preferred as anode protective film forming agents in situ as they are generally less corrosive to and reactive with other battery cell components are less likely to produce thicker, higher impedance layers over the long periods of exposure of the anode surface to the electrolyte in battery cell. Particularly preferred are aliovalent mixtures, for example a mixture of $LiH_2PO_4$ and $LiHSO_4$, which, as noted above, can be beneficial by increasing the ionic conductivity of the resulting protective layer.

While the invention is not limited by this theory, it is believed that a porous LiCl film is formed on unprotected lithium exposed to $SOCl_2$. The porous film grows continuously with time, to a thickness estimated at from about 1 to 10 microns depending on exposure time. Over extended periods of exposure time the porosity of the film increases to a point where the boundary of the film becomes ill-defined. In contrast, the protective films formed by acid treatment in accordance with the present invention are believed to be thin (e.g., about 10-500 Å, for example about 50-100 Å) and dense. Testing indicates that the impedance of an acid treatment generated film does not increase with time, indicating that the film thickness does not increase with time.

Protected Anodes

Protected anodes in accordance with the present invention are composed of an active metal anode material (e.g., Li) having a surface coated with a thin protective layer of an inorganic compound with active Li-ion conductivity. Particularly preferred examples of such compounds are lithium phosphate, lithium metaphosphate, and/or their aliovalent mixtures or solid solutions with each other or lithium sulfate. Such chemical protection of the Li or other active metal electrode significantly reduces the voltage delay due to the protected anode's improved stability toward the electrolyte. In one embodiment, the protective film includes $Li_3PO_4$ and $Li_2SO_4$. The presence of anions with different valences (multivalent or "aliovalent" anions) in the protective layer can be beneficial by increasing its ionic conductivity because they result in the formation of additional mobile ionic point defects in the crystalline lattice.

The base active metal for the anode material is an alkali or alkaline earth metal or alloy thereof. In particular Li metal is used. However, the invention is also applicable to other alkali metals, including sodium and potassium, and alloys thereof, and alkaline earth metals, including rubidium, beryllium, magnesium and calcium, and alloys thereof.

FIG. 1 illustrates a protected active metal anode structure in accordance with one embodiment of the present invention. The depicted protected anode structure 100 is a horizontal cross-sectional view of a cylindrical anode adapted for use in a cylindrically shaped battery cell. Of course, battery cells of this type may be of other shapes including rectangular, prismatic, etc., and the protected anode may have a suitable corresponding shape. The invention is in no way limited to the particular shape of an anode or battery cell. The protected anode structure 100 includes a base active metal anode 102 with a thin active metal-ion conducting protective film 104, as described above, on its inner surface (the surface that is in contact with a the liquid electrolyte in a liquid cathode battery cell).

The protective film 104 on the anode 102 may be formed either ex situ or in situ according to methods described herein. The anode structure may further include a separator (not shown) on the protective layer. For the depicted cylindrical anode, the separator would also generally have a cylindrical form. Suitable separators for active metal anode/liquid cathode battery cells are well known. They are generally highly porous materials which allow free passage of liquid the liquid cathode/electrolyte but prevent contact (and shorting) of the anode to the cathode current collector. For example, the separator may be composed of a glass fiber sheet.

Supplemented Electrolyte/Liquid Cathodes

The invention also includes supplemented electrolyte/liquid cathodes, that is non-aqueous electrochemical cell electrolyte/liquid cathodes supplemented with additives for forming and/or maintaining active metal-ion conducting protective films on active metal anodes in battery cells.

The supplemented electrolyte/liquid cathodes contain a cathode depolarizer/electrolyte solvent such as are known and used in conventional Li metal-liquid cathode cells. Examples include liquid oxyhalide, non-metallic oxide or non-metallic halide solvents or mixtures thereof. Specific example include thionyl chloride ($SOCl_2$), sulfuric oxychloride (sulphuryl chloride; $SO_2Cl_2$), phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), nitryl chloride ($NOCl$), nitrogen dioxide ($NO_2$), sulfur monochloride ($S_2Cl_2$) and sulfur monobromide ($S_2Br_2$), and mixtures thereof. Thionyl chloride ($SOCl_2$) is most commonly used and preferred in the electrolyte/liquid cathodes of the present invention. An electrolyte salt containing an active metal cation and an halo-containing anion is dissolved in the solvent. $LiAlCl_4$ is a preferred electrolyte salt.

To this base electrolyte/liquid cathode is added one or more anode protective film forming additives. The additive(s) are provided in an amount effective to form an active metal ion-conducting protective film coating an active metal anode material, as described herein. Particularly preferred examples of such compounds are lithium phosphate, lithium metaphosphate, and/or their aliovalent mixtures or solid solutions with each other or lithium sulfate. The material of the protective layer should have very low solubility in the battery liquid cathode/electrolyte. Lithium phosphate and lithium metaphosphate satisfy this requirement: for instance, the experimentally determined solubility of $Li_3PO_4$ in 1.5 M $LiAlCl_4$, $SOCl_2$ solution is less than 60 mg/l and in 1.5 M $LiAlCl_4$+0.5 M $AlCl_3$, $SOCl_2$ solution about 50 mg/l, and solubility of $LiPO_3$ in $SOCl_2$ is less than 77 mg/l.

The additive(s) may include one or more of $H_3PO_4$, $HPO_3$, their active metal acidic salts (i.e., $XH_2PO_4$, $X_2HPO_4$) and mixtures thereof and mixtures thereof with one or more of $H_2SO_4$ and $XHSO_4$, where X is an atom of the active metal (e.g., Li). Tetra alkyl ammonium salts of phosphoric acid, such as $NR_4H_2PO_4$, where R is an alkyl group (e.g., $C_4H_9$), may also be used as a protective film forming additive alone or in combination with other agents as noted above.

The concentration of the dilute acid additives in the electrolyte/liquid cathode is generally less than 10% by weight, for instance less than 1% by weight, and is preferably in the ppm range, for example between about 50 to 5000 ppm, more preferably about 100 to 2500 ppm. Phosphoric acid is generally used in higher concentration than sulfuric acid. In one specific example, about 1500 ppm of anhydrous phosphoric acid and about 200 ppm of concentrated sulfuric acid (96-98%) may be used.

In some embodiments, the electrolyte/liquid cathode may include an anode protective film forming additive composed of mixed acids/salts with aliovalent (multivalent) anions. In one embodiment, the acids are $H_3PO_4$ and $H_2SO_4$ or aliovalent combinations of their corresponding acidic salts. As noted above, the use of acid mixtures for Li surface treatment can be beneficial by increasing the ionic conductivity of the protective layer. Acidic salts are preferred as anode protective film forming agents in situ as they are generally less corrosive to and reactive with other battery cell components are less likely to produce thicker, higher impedance layers over the long periods of exposure of the anode surface to the electrolyte in battery cell. Particularly preferred are aliovalent mixtures, for example a mixture of $LiH_2PO_4$ and $LiHSO_4$, which, as noted above, can beneficially increase the ionic conductivity of the resulting protective layer.

Many applications require not just one continuous full discharge, but rather a partial discharge followed by storage and further discharge or even several discharge-rest-discharge iterations. Incorporation into the electrolyte/liquid cathode system of such protective film forming additive that can react with any exposed Li surface to form a protective layer based on lithium phosphate or phosphate and sulfate allows for in situ formation of protective films either before an initial discharge or between discharge events. The additives can also effectively heal cracks, which form in the protective layer during partial discharge. An important feature of these additives is solubility in Li—$SOCl_2$ and the like based cell electrolyte/liquid cathodes, so it is possible to have a large reservoir of the protective layer forming agent in the cell for in situ treatment of the Li anode surface.

In some embodiments, the electrolyte/liquid cathode may further be supplemented by the addition of the Li or other active metal salt or salts corresponding to the protective film material(s). Such additives can be used to saturate the electrolyte with the already minimally soluble protective film material further suppressing dissolution of the protective film in the liquid cathode/electrolyte.

The use of protected Li anodes also allows for the use electrolyte/liquid cathode systems that would otherwise be detrimental to Li battery cells, particularly the cathodes of such cells. The cathode side of lithium-thionyl chloride (Li—$SOCl_2$) and the like battery cells is prone to precipitation of LiCl in the pores of carbon current collector. The rate capability of the cathodes can be improved by solubilizing the LiCl precipitate with additions to the electrolyte system. Addition of $AlCl_3$ to a conventional electrolyte system, or supplemented electrolyte in accordance with the present invention, leads to the dissolution of LiCl in the pores of the cathode carbon current collector while the presence of the protective coating on the anode prevents the $AlCl_3$, which is corrosive to Li, from corroding the anode. It is believed that the $AlCl_3$ acts as a getterer for LiCl, reacting with it to generate additional $LiAlCl_4$ electrolyte salt, although the invention is not limited by this theory.

Battery Cells

Batteries of this invention may be constructed according to various known processes for assembling liquid cathode cell components and cells. The exact structure will depend primarily upon the intended use of the battery unit. Examples include cylindrical and prismatic cells.

Generally, batteries employing the protected anodes of this invention will be combined with a liquid cathode. The liquid cathode generally fills a porous electronic conductor material that incorporates a current collector. The anode is spaced and electrically insulated from the cathode electronic conductor by a porous separator.

Figure 2:
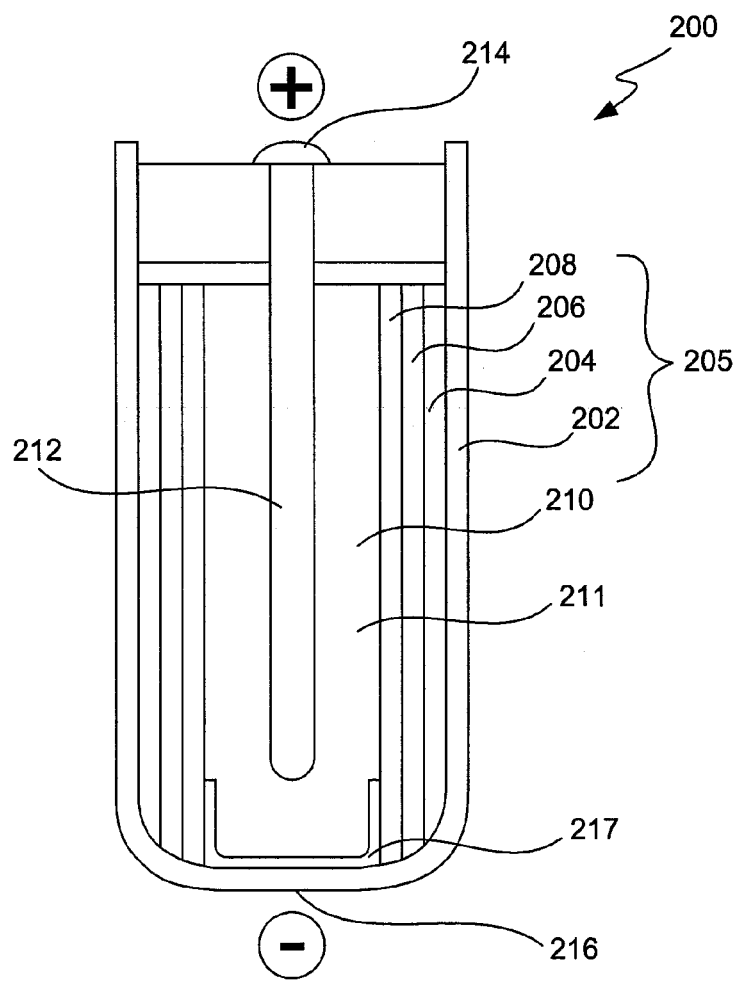
FIG. 2 illustrates a battery cell containing a protected anode in accordance with one embodiment of the present invention.

Referring now to FIG. 2, a cell 200 in accordance with one embodiment of the present invention is shown. The depicted cell 200 is a vertical cross-sectional view of a cylindrical battery cell. The cell is shown in simplified form to illustrate important aspects of the present invention. Additional features and details of active metal anode-liquid cathode battery cells are not specifically addressed here so as to not obscure the invention. Any such additional features and details necessary to construct such a battery cell are well known in the art. Of course, battery cells of this type may be of other shapes including rectangular, prismatic, etc., and the protected anode may have a suitable corresponding shape. The invention is in no way limited to the particular shape of a battery cell.

The cell 200 has a casing 202. The casing 202 is composed of a sturdy material that protects the battery from damage. The casing 202 may also in part serve as a current collector and contact for the anode (negative electrode) of the battery cell. The anode current collector serves to conduct electrons between the negative cell terminal 216 and the anode 204 to which current collector is affixed and/or electrically connected. In preferred embodiments, the casing is made of stainless steel.

Adjacent to and electrically connected with the casing is the active metal anode 204. The active metal may be a variety of materials, as described herein, but is preferably Li. The anode 204 is coated with a protective film 206 that is conductive to active metal (e.g., Li) ions, as described herein.

Adjacent to the protected anode 205 is a porous separator 208 to physically and electrically separate the anode from the cathode electronic conductor 210. For the depicted cylindrical cell, the separator would also generally have a cylindrical form. Suitable separators for active metal anode/liquid cathode battery cells are well known. They are generally highly porous materials which allow free passage of liquid the liquid cathode/electrolyte but prevent contact (and shorting) of the anode to the cathode electronic conductor/current collector. For example, the separator 208 may be composed of a glass fiber sheet.

The cathode (positive electrode) electronic conductor 210 abuts the side of separator 208 opposite protected anode 205. The cathode electronic conductor is a porous material that is filled with the liquid cathode/electrolyte (cathode depolarizer/electrolyte) 211. For example, the cathode electronic conductor 210 may be a carbon mesh or matrix. The liquid cathode/electrolyte may be any conventional electrolyte for the type of cell in question, or it may be a supplemented electrolyte, as described herein. As the liquid cathode/electrolyte 211 is an electronic insulator and an ionic conductor and the porous separator is an electronic insulator but allows the liquid cathode/electrolyte to penetrate to the anode, the cathode electronic conductor is ionically coupled to but electronically insulated from the protected anode 205. The cathode electronic conductor is also affixed to and/or electronically connected with a positive current collector 212, for example, a carbon or steel rod. The positive current collector 212 provides an electronic connection between a positive cell terminal 215 and the positive cell electrode (made up of its liquid ionic conductor (cathode depolarizer) and solid electronic conductor). An insulator 217 is provided in the cell 200 to prevent shorting of the positive electrode to the negative current collector and terminal.

Such liquid cathode cells with protected active metal anodes in accordance with the present invention reduce voltage delays and improve performance relative to conventional state of the art liquid cathode batteries.

EXAMPLES

Various experiments were conducted to demonstrate the advantages provided by various aspects of this invention. The examples presented here are intended to better illustrate the invention as described herein and are non-limiting.

Example 1

Comparison of Surface Impedance for Protected and Unprotected Li Anodes

A Li electrode surface (125 micron foil from Cyprus Foote Mineral Company) was treated with dry DME containing 1500 ppm of anhydrous phosphoric acid and 200 ppm of concentrated sulfuric acid (96-98%). Just before treatment, the Li surface was polished with Tyvec fabric (1509 B). Surface treatment was conducted by dipping of the Li electrode having surface area of about 2.0 cm into a 20 ml flask filled with the acid containing solution. Duration of the treatment was two minutes. After the Li surface reaction with acids and formation of a protective layer, the Li surface was rinsed with pure dry DME and dried. All described operations were conducted in Ar-filled glove box.

Electrochemical measurements were performed in 4-electrode glass cells containing a Li working electrode placed between two porous carbon counter electrodes. A Li wire located close (about 1 mm) to the surface of the working electrode served as a reference electrode. The cell was filled with 12 ml of $LiAlCl_4$, $SOCl_2$ electrolyte solution and was located in a glove box.

The ac impedance measurements were used to control Li surface resistance after various periods of cell storage under OCP conditions.

Figure 3:
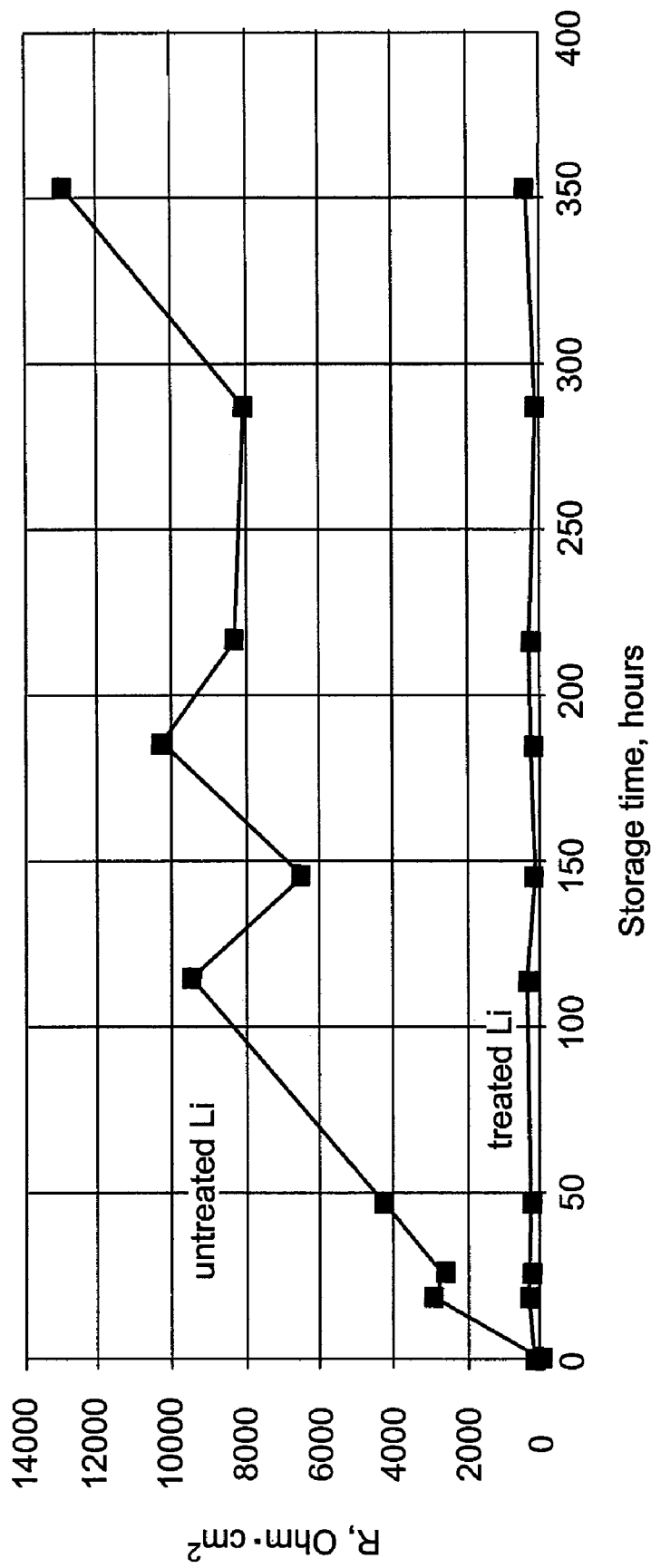
FIG. 3 illustrates a plot of data of a comparison of surface impedance for protected and unprotected Li anodes in accordance with one embodiment of the present invention.

Tests were performed to compare the cells having a protected Li anode in accordance with the invention and the cells with conventional, untreated Li anodes. The results were plotted in FIG. 3. As can be seen, the Li/electrolyte interface impedance for the treated (protected) Li electrode was small and stable during cell storage. At the same time the interface impedance for the untreated Li electrode grew rapidly during storage. This dramatic difference in Li electrode stability towards thionyl chloride electrolyte indicates that the described Li treatment produces a highly protective surface layer.

Example 2

Figure 4:
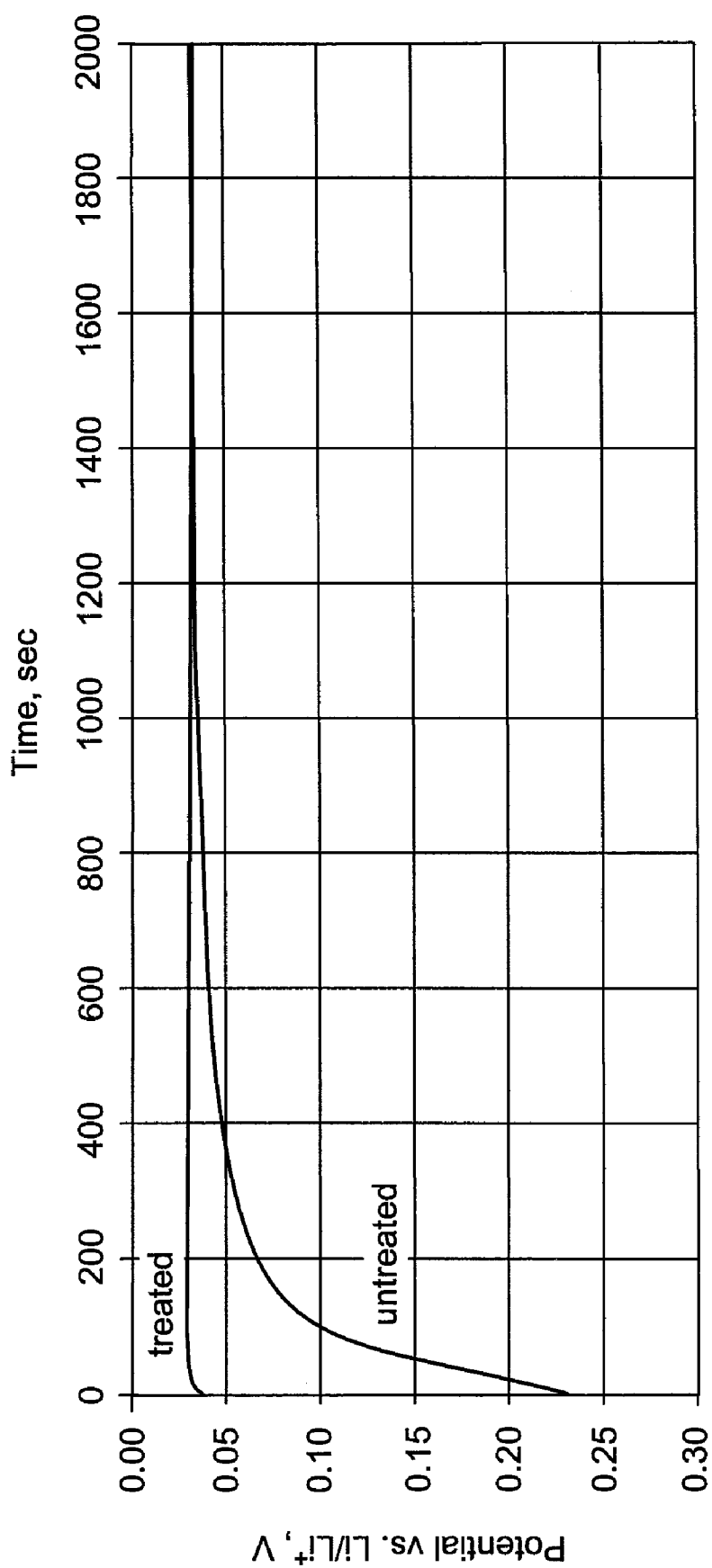
FIG. 4 illustrates a plot of data of a comparison of discharge voltage vs. time protected and unprotected Li anodes in accordance with one embodiment of the present invention.

Comparison of Discharge Voltage vs. Time for Protected and Unprotected Li Anodes Electrochemical cells containing the Li chemically treated in the mixture of phosphoric and sulfuric acids dissolved in dry DME as described above in Example 1, were assembled and discharged at a current density of 0.5 $mA/cm^2$ after storage at OCP for 11 days. The cell electrolyte was 1.5 M $LiAlCl_4$ in $SOCl_2$. Similar cells having untreated Li electrodes were discharged simultaneously. The results were plotted in FIG. 4. As can be seen, the cell with pretreated Li electrode demonstrates a flat discharge voltage vs. time profile without visible voltage depression. In contrast, the discharge curve for the conventional Li electrode has a significant voltage delay with a voltage recovery time of several tens of minutes. This data indicates that the phenomenon of voltage delay can be completely eliminated or at least significantly reduced in lithium thionyl chloride batteries by using chemically produced protective layers on the Li anode surface in accordance with the present invention.

Example 3

Corrosion Testing

The electrochemical cells containing Li chemically treated in the mixture of phosphoric and sulfuric acids dissolved in dry DME as described in Example 1, and similar cells with untreated Li anode were assembled. The cell electrolyte was 1.5 M $LiAlCl_4$ in $SOCl_2$ with addition of 0.5 M of $AlCl_3$. After storage overnight the part of untreated Li electrode immersed in the electrolyte was completely dissolved due to corrosion. In contrast, the surface of the treated Li electrode appeared unchanged. In addition, the treated electrode had similar values of interface impedance (in accordance with the procedure described in Example 1) before and after cell storage. This data indicates that Li electrodes chemically treated with acids in accordance with the present invention exhibit improved stability towards highly corrosive electrolytes containing $AlCl_3$.

CONCLUSION

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. For example, while the invention is primarily described with reference to lithium systems, the invention pertains more broadly to the class of active metal battery systems (e.g., batteries having negative electrodes of alkali (e.g., sodium and potassium) and alkaline earth (e.g., calcium and magnesium), metals and alloys. Accordingly, the present embodiments are to be considered as illustrative and not restrictive, and the invention is not to be limited to the details given herein, but may be modified within the scope and equivalents of the appended claims.

The entire disclosures of all references cited herein are incorporated by reference for all purposes.

What is claimed is:

1. A method of forming a protective film on an active metal negative electrode, comprising:
   providing an active metal anode material;
   forming an active metal ion-conducting protective film on the active metal anode material, the film comprising an active metal salt selected from the group consisting of active metal phosphate, active metal metaphosphate and combinations thereof, wherein the film is formed by contacting the anode material with one or anode protective film forming agents $SOCl_2$ in an amount effective to form an active metal ion-condulting protective film coating the active metal anode material.

2. The method of claim 1, wherein the anode protective film further comprises an active metal sulfate resulting in film comprising aliovalent anions.

3. The method of claim 1, wherein the one or more anode protective film forming agents are selected from the group consisting of $H_3PO_4$, $HPO_3$, $XH_2PO_4$, $X_2HPO_4$ and $NR_4H_2PO_4$ and mixtures thereof and mixtures thereof with one or more agents selected from the group consisting $H_2SO_4$ and $LiHSO_4$, where X is an atom of the active metal and R is an alkyl group.

4. The method of claim 3, wherein X is Li and R is $C_4H_9$.

5. The method of claim 1, wherein the protective film is formed outside a battery cell.

6. The method of claim 5, wherein the one or more anode protective film forming agents are $H_3PO_4$ and $H_2SO_4$.

7. The method of claim 6, wherein the anode material is contacted with the one or more anode protective film forming agents by a technique selected from the group consisting of dipping, spraying and painting.

8. The method of claim 1, wherein the protective film is formed in situ in an active metal-liquid cathode depolarizer/electrolyte battery cell whereby the one or more anode protective film forming agents are present as an additive in the battery cell cathode depolarizer/electrolyte.

9. The method of claim 8, wherein the cathode depolarizer/electrolyte comprises a solvent selected from the group consisting of liquid oxyhalides, non-metallic oxides, non-metallic halides and mixtures thereof.

10. The method of claim 8, wherein the electrolyte salt cation is comprised of lithium.

11. The method of claim 8, wherein the electrolyte salt anion is $AlCl_4^-$.

12. The method of claim 11, further comprising the addition of $AlCl_3$ to the cathode depolarizer/electrolyte solvent.

13. The method of claim 8, wherein the one or more anode protective film forming agents are selected from the group consisting of $LiH_2PO_4$ and $Li_2HPO_4$ and mixtures thereof and mixtures thereof with $LiHSO_4$.

14. The method of claim 1, wherein the anode material is contacted with the one or more anode protective film materials by a technique selected from the group consisting of sputtering, e-beam deposition, chemical vapor deposition and laser ablation.

15. The method of claim 1, wherein the protective film has a thickness between about 10 and 500 Å.

16. The method of claim 1, wherein the protective film has a thickness between about 50 and 100 Å.

* * * * *